United States Patent
Atkins et al.

(10) Patent No.: US 7,925,728 B2
(45) Date of Patent: Apr. 12, 2011

(54) FACILITATING DETECTION OF HARDWARE SERVICE ACTIONS

(75) Inventors: Mark G. Atkins, Arvada, CO (US); John Divirgilio, Middletown, NY (US); Jay R. Herring, Hyde Park, NY (US); LeRoy R. Lundin, West Hurley, NY (US); Nicholas P. Rash, Poughkeepsie, NY (US); Karen F. Rash, legal representative, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 11/223,322

(22) Filed: Sep. 8, 2005

(65) Prior Publication Data

US 2007/0055913 A1   Mar. 8, 2007

(51) Int. Cl.
    *G06F 15/16* (2006.01)
(52) U.S. Cl. ........................................ 709/223; 709/224
(58) Field of Classification Search .......... 709/222–318; 714/100
    See application file for complete search history.

(56) References Cited

U.S. PATENT DOCUMENTS

| | | | |
|---|---|---|---|
| 4,439,826 A | 3/1984 | Lawrence et al. ............. 364/200 |
| 4,937,825 A | 6/1990 | Ballard et al. ................ 371/20.1 |
| 5,347,511 A | 9/1994 | Gun .................................. 370/54 |
| 5,355,364 A | 10/1994 | Abali | |
| 5,453,978 A | 9/1995 | Sethu et al. | |
| 5,793,946 A | 8/1998 | Gauthier et al. ......... 395/183.01 |
| 5,812,549 A | 9/1998 | Sethu | |
| 5,884,090 A | 3/1999 | Ramanan et al. | |
| 6,021,442 A | 2/2000 | Ramanan et al. | |
| 6,038,611 A * | 3/2000 | Masel ............................ 719/328 |
| 6,199,068 B1 * | 3/2001 | Carpenter ............................ 1/1 |
| 6,553,515 B1 | 4/2003 | Gross et al. ...................... 714/47 |
| 6,584,506 B1 * | 6/2003 | Perlman et al. ............... 709/227 |
| 6,594,305 B1 | 7/2003 | Roeck et al. ................... 375/222 |
| 6,701,459 B2 | 3/2004 | Ramanathan et al. .......... 714/37 |
| 7,146,497 B2 * | 12/2006 | Almeida et al. ............... 713/100 |
| 7,496,652 B2 * | 2/2009 | Pezzutti ......................... 709/223 |
| 7,562,248 B2 * | 7/2009 | Topham ........................... 714/6 |
| 7,574,494 B1 * | 8/2009 | Mayernick et al. ........... 709/222 |
| 2002/0019948 A1 * | 2/2002 | Katou et al. ................... 713/202 |
| 2002/0087669 A1 * | 7/2002 | Idsinga ......................... 709/222 |
| 2003/0110319 A1 * | 6/2003 | Kim et al. ......................... 710/1 |
| 2004/0267923 A1 * | 12/2004 | Rover et al. ................... 709/223 |
| 2005/0022209 A1 * | 1/2005 | Lieblich et al. ............... 719/318 |
| 2005/0071474 A1 * | 3/2005 | Lei et al. ....................... 709/227 |
| 2005/0071625 A1 * | 3/2005 | Schwartz et al. ............. 713/100 |
| 2005/0165950 A1 * | 7/2005 | Takagi et al. ................. 709/236 |
| 2006/0031456 A1 * | 2/2006 | Della ............................. 709/224 |
| 2006/0158037 A1 * | 7/2006 | Danley et al. ................... 307/64 |
| 2006/0179134 A1 * | 8/2006 | Shemesh et al. .............. 709/223 |
| 2006/0182036 A1 * | 8/2006 | Sasagawa et al. ............. 370/242 |

OTHER PUBLICATIONS

"An Introduction to the New IBM eServer pSeries High Performance Switch," SG24-6978-00, Dec. 2003.

* cited by examiner

*Primary Examiner* — Bunjob Jaroenchonwanit

(74) *Attorney, Agent, or Firm* — Steven Chiu, Esq.; Kevin P. Radigan, Esq.; Heslin Rothenberg Farley & Mesiti P.C.

(57) ABSTRACT

A series of state transitions is indicative of performance of hardware service actions. A transition from, for instance, a disconnected state to a connected state for a hardware component is indicative of performance of a service action for the hardware component. Detection of this transition is automatic.

12 Claims, 5 Drawing Sheets

FACILITATING DETECTION OF HARDWARE SERVICE ACTIONS

TECHNICAL FIELD

This invention relates, in general, to processing within communications environments, and in particular, to facilitating detection of service actions of hardware components of the communications environment.

BACKGROUND OF THE INVENTION

In communications environments, such as those that include communications networks, it is beneficial to distinguish between operator repaired connections and intermittently available connections in the network. By making such a distinction, connections that have not been repaired are not reintegrated into the network. This avoids additional outages and recovery actions that negatively impact application function and performance.

Previously, in order to distinguish between operator repaired connections and intermittently available connections, an operator would send notification that the connection has been repaired. This, however, requires additional procedures and education for the operator.

Based on the foregoing, a need exists for a hardware service action detection capability that does not rely on the operator. In particular, an improved hardware service action detection capability is needed.

SUMMARY OF THE INVENTION

The shortcomings of the prior art are overcome and additional advantages are provided through the provision of a method of facilitating detection of hardware service actions. The method includes, for instance, detecting that a state associated with a hardware component of a communications environment has transitioned from a disconnected state to a connected state, wherein detection of the transition from the disconnected state to the connected state is indicative of performance of a service action for the hardware component.

In a further aspect of the present invention, a method of facilitating detection of hardware service actions is provided. The method includes, for instance, detecting a predefined series of state transitions associated with a hardware component of a communications environment, wherein detection of the predefined series of state transitions is indicative of performance of a service action for the hardware component.

System and computer program products corresponding to the above-summarized methods are also described and certain aspects thereof claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for facilitating detection of hardware service actions. Performance of a service action for a hardware component is indicated by a particular series of state transitions. For instance, performance of a service action is indicated by a transition from the disconnected state to a connected state of the hardware component. The transition is detected (e.g., automatically) and is used to indicate servicing of the hardware component. This capability is usable in many types of communications environments and for many different types of hardware components.

In one example, the detection capability of an aspect of the present invention is incorporated and used in a communications environment that includes a communications network. One type of a communications network is a switch network, and examples of switch networks are described in U.S. Pat. No. 6,021,442, entitled "Method And Apparatus For Partitioning An Interconnection Medium In A Partitioned Multiprocessor Computer System," Ramanan et al., issued Feb. 1, 2000; U.S. Pat. No. 5,884,090, entitled "Method And Apparatus For Partitioning An Interconnection Medium In A Partitioned Multiprocessor Computer System," Ramanan et al., issued Mar. 16, 1999; U.S. Pat. No. 5,812,549, entitled "Route Restrictions For Deadlock Free Routing With Increased Bandwidth In A Multi-Stage Cross Point Packet Switch," Sethu, issued Sep. 22, 1998; U.S. Pat. No. 5,453, 978, entitled "Technique For Accomplishing Deadlock Free Routing Through A Multi-Stage Cross-Point Packet Switch," Sethu et al., issued Sep. 26, 1995; and U.S. Pat. No. 5,355, 364, entitled "Method Of Routing Electronic Messages," Abali, issued Oct. 11, 1994, each of which is hereby incorporated herein by reference in its entirety.

Figure 1:
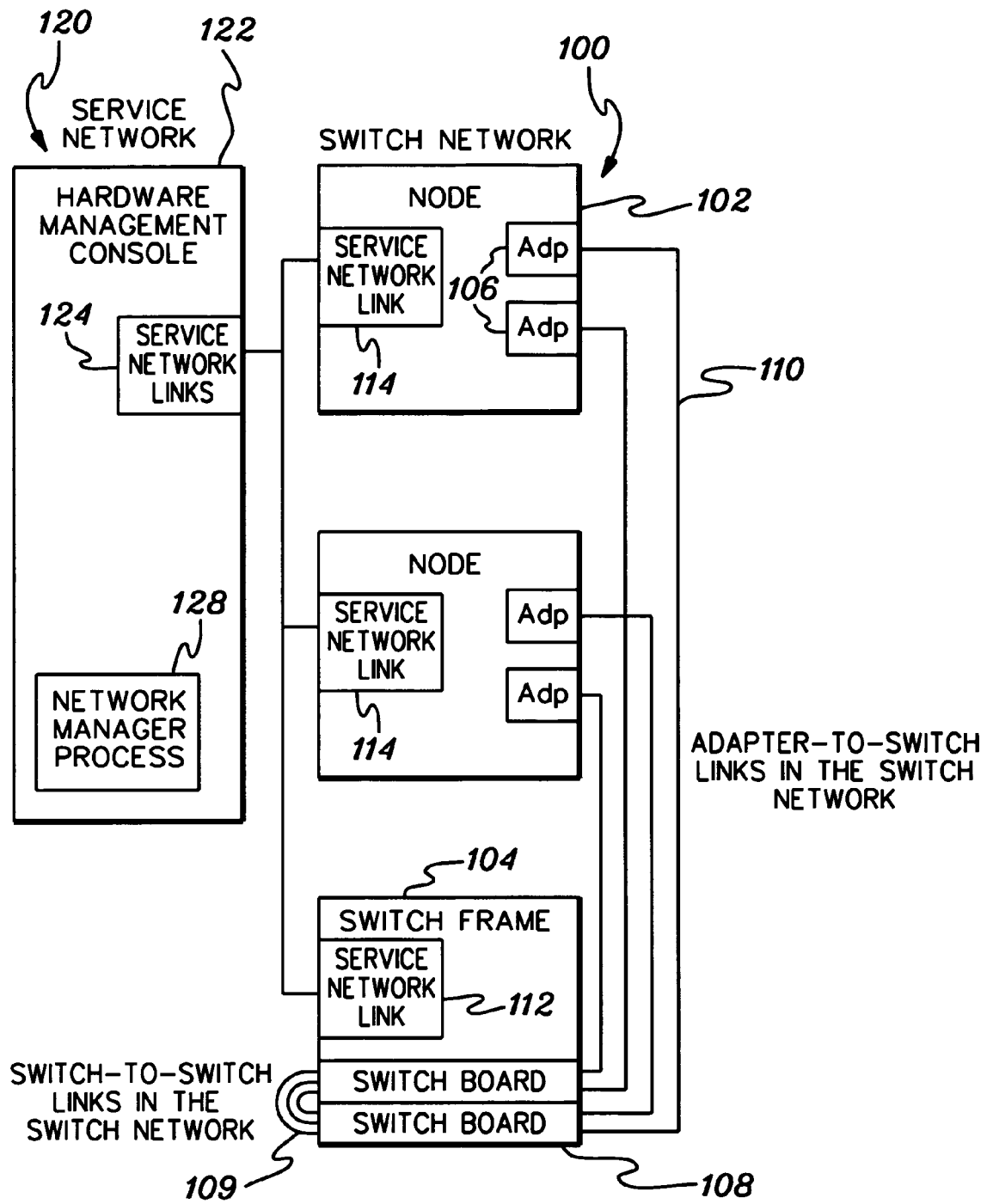
FIG. 1 depicts one example of a switch network coupled to a service network, in accordance with an aspect of the present invention.

One embodiment of a communications network incorporating and using one or more aspects of the present invention is described with reference to FIG. 1. A communications network 100 is, for instance, a switch network that may be optical, copper, phototonic, etc., or any combination thereof. As is known, a switch network is used in communicating between computing units (e.g., processors) of a system, such as a central processing complex. The processors may be, for instance, pSeries processors or other processors, offered by International Business Machines Corporation, Armonk, N.Y. One switch network offered by International Business Machines Corporation is the High Performance Switch (HPS) network, an embodiment of which is described in "An Introduction to the New IBM eServer pSeries High Performance Switch," SG24-6978-00, December 2003, which is hereby incorporated herein by reference in its entirety.

Switch network 100 includes, for example, a plurality of nodes 102, such as Power 4 nodes offered by International Business Machines Corporation, Armonk, N.Y., coupled to one or more switch frames 104. A node 102 includes, as an example, one or more adapters 106 (or other network interfaces) coupling nodes 102 to switch frame 104. Switch frame 104 includes, for instance, a plurality of switch boards 108, each of which is comprised of one or more switch chips. Each switch chip includes one or more external switch ports, and optionally, one or more internal switch ports. A switch board 108 is coupled to one or more other switch boards via one or more switch-to-switch links 109 in the switch network. Further, one or more switch boards are coupled to one or more adapters of one or more nodes of the switch network via one or more adapter-to-switch links 110 of the switch network.

Switch frame 104 also includes at least one service network link 112 (e.g., Ethernet adapter) coupling the switch frame to a service network 120. Similarly, a node 102 includes, for instance, one or more service network links 114 (e.g., Ethernet adapters) coupling the node to service network 120.

Service network 120 is an out-of-band network that provides various services to the switch network. In this embodiment, the service network is responsible for verifying the health of the switch network and for detecting hardware service actions. In one example, service network 120 includes a hardware management console 122 having, for instance, one or more service networks links 124 (e.g., Ethernet adapters), which are coupled to one or more links 114 of nodes 102 and/or one or more links 112 of switch frame 104. The hardware management console executes at least one network manager process 128 (also referred to herein as the network manager) that is responsible for verifying the switch network, as well as the service network. It is the network manager process that is used to detect hardware service actions, as described herein.

One particular example of a hardware component for which a determination is made as to whether a service action has been performed is a link (i.e., a form of a connector or connection) within the communications network, such as a self-timing link. Although in the embodiments herein a link is described, this is only one example. Many other hardware components that are capable of being disconnected and reconnected and the systems that employ them can benefit from one or more aspects of the present invention.

Figure 2:
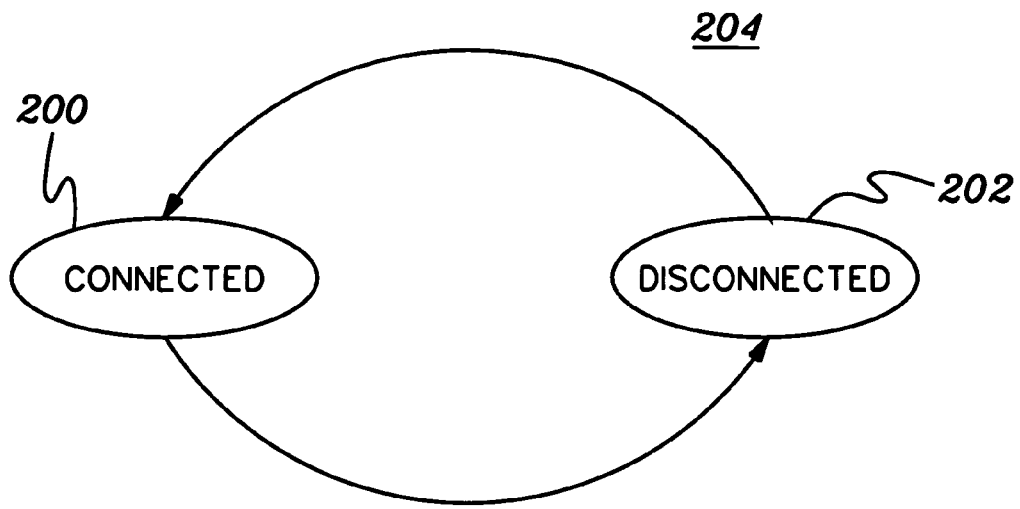
FIG. 2 depicts one example of a state diagram illustrating physical states of a hardware component, in accordance with an aspect of the present invention.

A hardware component has a plurality of states associated therewith. In one example, the states include a connected state 200 (FIG. 2) and a disconnected state 202, as shown in state diagram 204 of FIG. 2. When a connection is made, such as an operator plugs in a cable of a link, the link transitions to connected state 200. In contrast, when a connection is broken, such as the operator unplugs the cable, the link transitions to disconnected state 202.

Subsequent to connecting the link, the data passing viability of the link is determined using the hardware states, which are queryable. For instance, the states are stored in registers on the hardware component (e.g., link) and are accessed by the network manager to determine viability, as described below.

Figure 3:
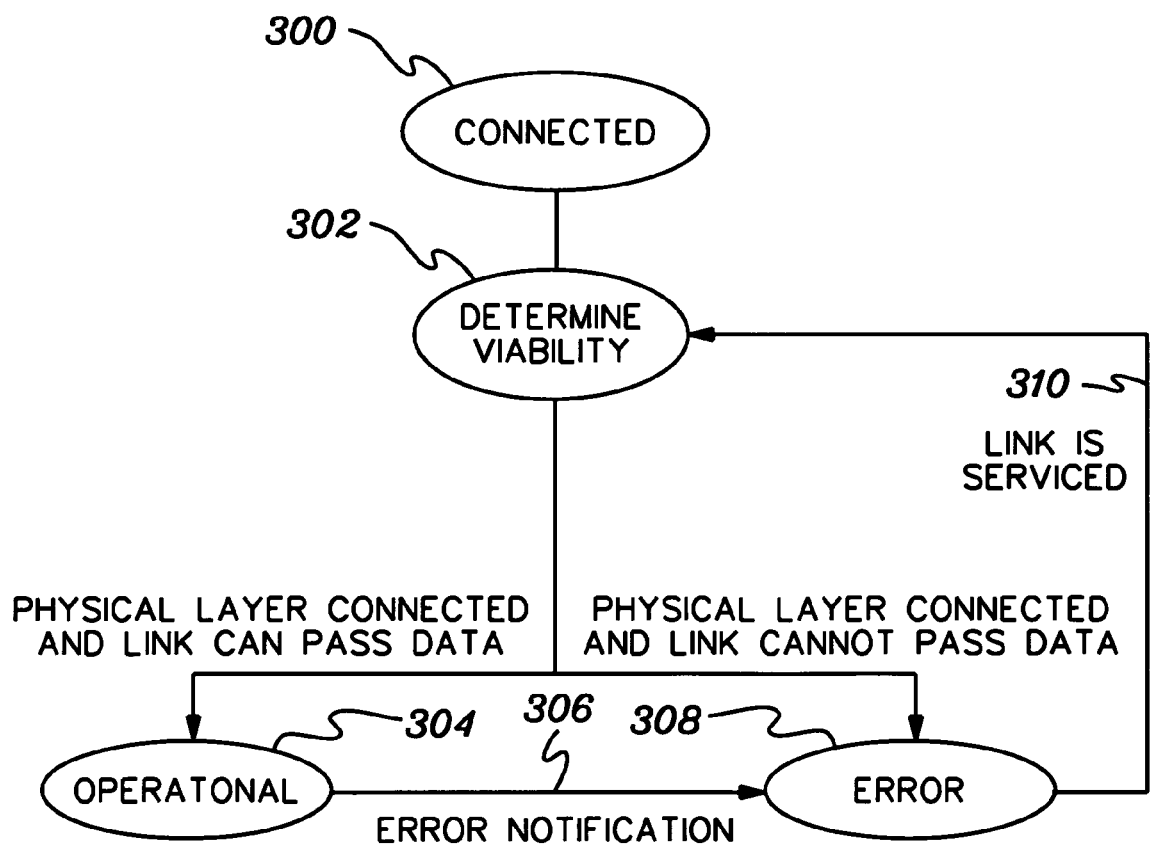
FIG. 3 depicts one embodiment of the logic associated with determining viability of a hardware component, in accordance with an aspect of the present invention.

One embodiment of the logic associated with determining viability is described with reference to FIG. 3. Normal operation of a viable link starts with the physical layer of the link (e.g., the actual hardware of the link) being in a connected state 300. In response to the connection being made, such as the cable being plugged in, the hardware registers are queried by the network manager to determine if the link is viable and is able to pass data 302. As an example, the network manager determines that the link is timed and that there are no errors. This can be accomplished by checking the value of one or more bits in one or more registers, as an example.

If the link is viable in that it is connected and is able to pass data, the network manager is in operational state 304, as it relates to this link. It stays in this state until an error is encountered in the physical layer.

When an error is encountered, the network manager is notified 306 and the network manager is placed in an error state 308 for this link. The network manager remains in the error state until the link is serviced, in accordance with an aspect of the present invention. Responsive to servicing the link 310, processing continues with determining viability.

Figure 4:
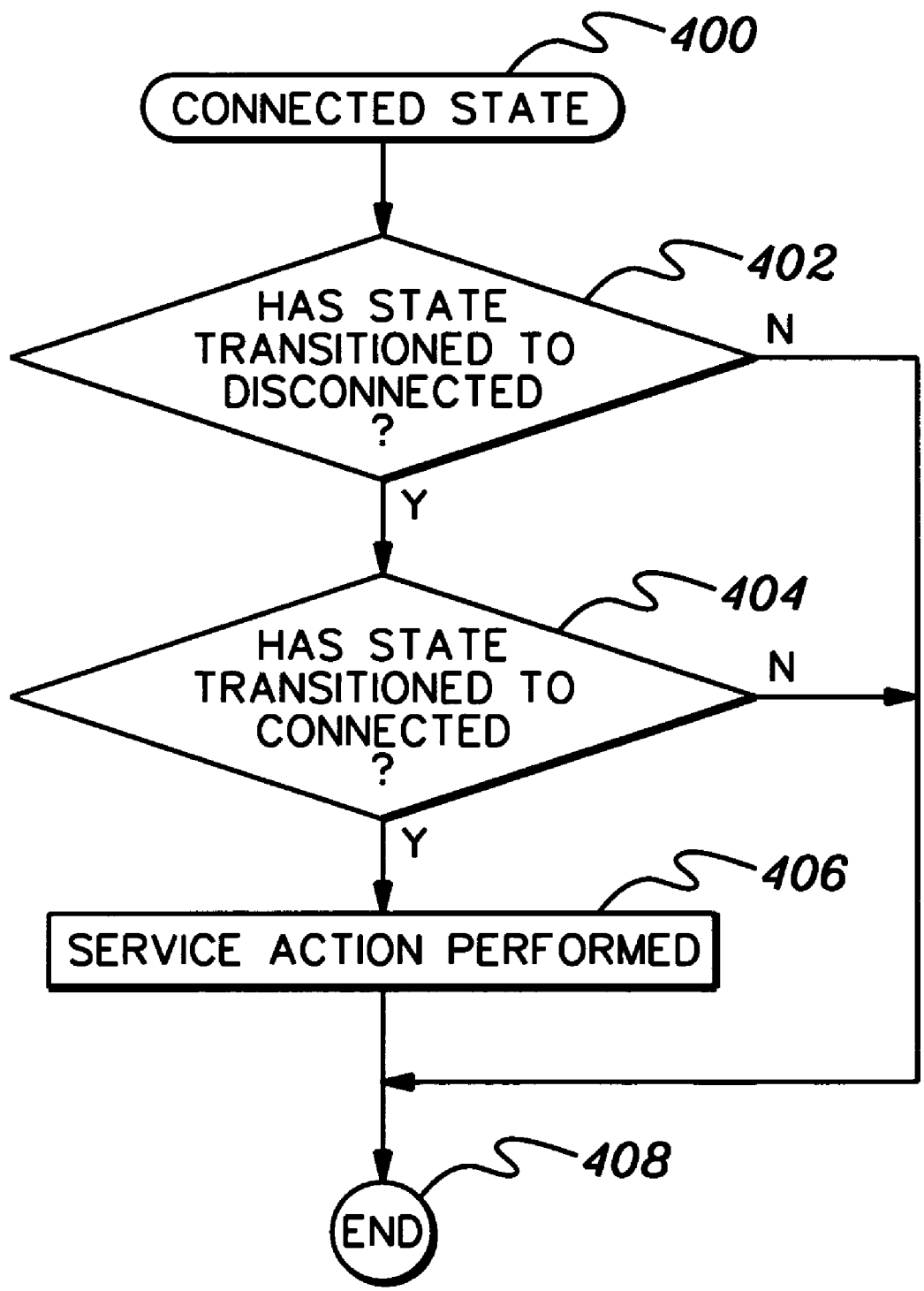
FIG. 4 depicts one embodiment of the logic associated with detecting performance of a hardware service action, in accordance with an aspect of the present invention.

In accordance with an aspect of the present invention, determination of when the link (or other hardware component) has been serviced is facilitated. One embodiment of the logic associated with detecting hardware service actions is described with reference to FIG. 4. As one example, the detecting is automatic (e.g., without user intervention).

Initially, the state of the hardware component is connected, STEP 400. If the state transitions to disconnected, INQUIRY 402, this is an indication that servicing may be active. When the state transitions from disconnected back to connected, INQUIRY 404, this is an indication that a hardware service action has been performed, STEP 406. If there has been no transition from connected to disconnected to connected, then the assumption is made that a service action has not been performed, STEP 408.

Indication that a service action has been performed is not an indication, necessarily, that the link is operational. To determine whether the link is operational, viability testing is performed, as described with reference to FIG. 3.

Figure 5:
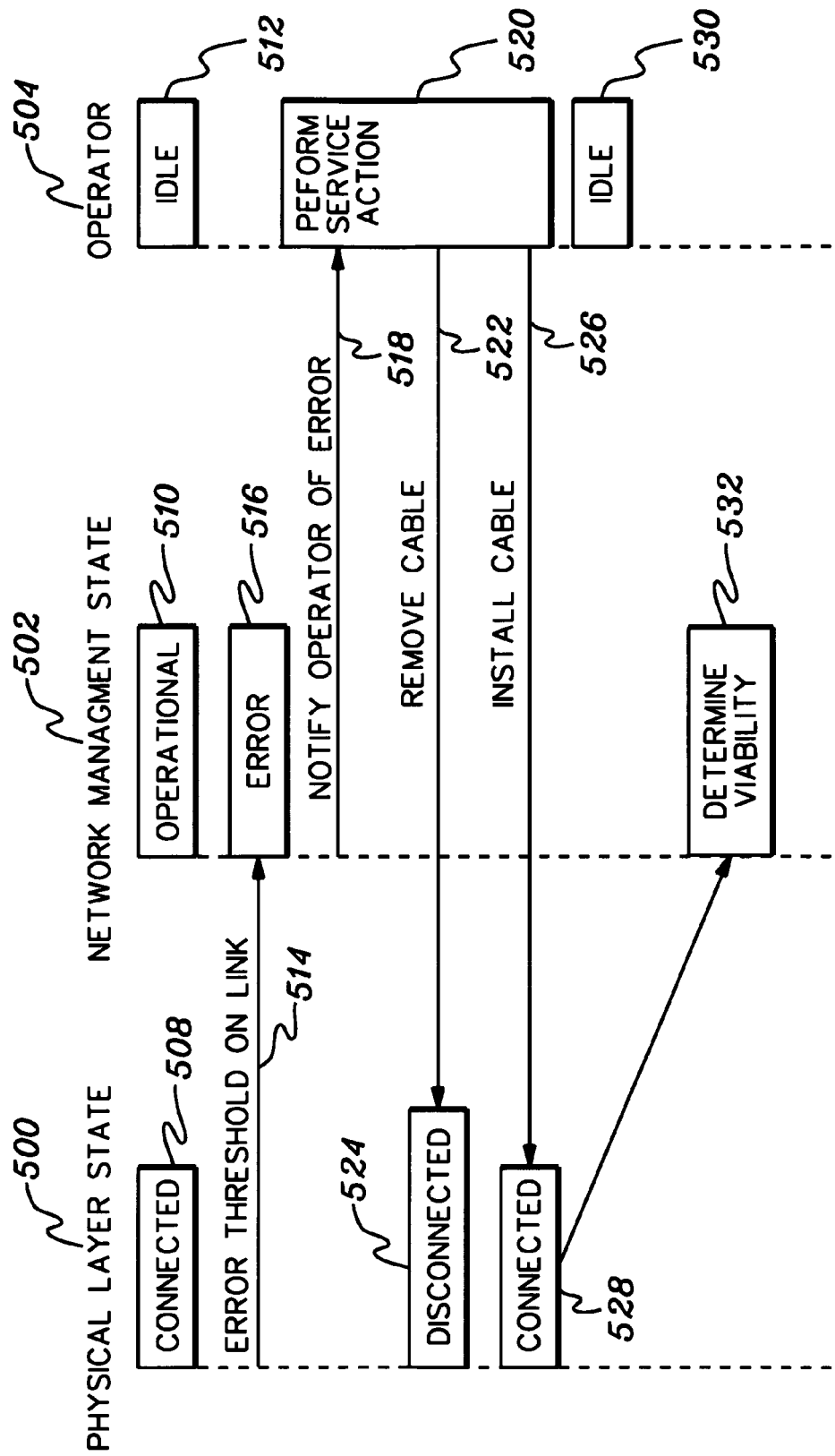
FIG. 5 depicts further details associated with one embodiment of the hardware service action detection capability of the present invention.

Further details regarding the use of state transitions to indicate whether service actions have been performed are described with reference to FIG. 5. In this figure, three entities are considered, a physical layer state 500, which is the state of the hardware component, a network management state 502, which is the state of the network manager as it relates to this hardware component, and an operator 504.

As described above, normal operation of a viable link starts with the physical layer being in the connected state 508. When the connection is made, such as a cable of a link is connected, the hardware (e.g., link) is queried by the network manager to determine if the link is viable and can pass data. If it is considered viable, the network manager transitions into the operational state 510, and remains there until an error is encountered in the physical layer. At this point in time, the operator is idle 512. In response to encountering an error 514, the network manager is notified and the network manager transitions into the error state 516. The network manager notifies the operator of the error 518 and it remains in the error state until the link has been serviced.

To service the link, the operator performs one or more service actions 520. For instance, the operator removes a cable of the link, removes a suspect part, installs a new part, and connects the cable. When the operator removes the cable 522, the physical layer transitions to disconnected state 524. During the disconnected state, it is assumed that the operator is correcting the problem prior to reconnecting the cable. When the cable is installed 526, the physical layer is transitioned into the connected state 528. It is this state transition from disconnected to connected that indicates that the link has been serviced.

The network manager detects the various state transitions of the link (or other hardware component) by monitoring and querying the states of the link. For example, when the connection is made, the network manager is notified of existence of the link via, for instance, an asynchronous message, and then, the network manager queries registers on the link that store the states of the link.

Subsequent to detecting the transition from disconnected to connected resulting from performing the service actions, the operator is idle 530 and viability of the link is determined 532 by the network manager. As described with reference to FIG. 3, viability is determined by checking one or more registers. Further, in another embodiment, determining viability includes waiting a predetermined amount of time (e.g., 5 minutes) before using the link to ensure it is stable. In other embodiments, however, the wait time is zero or another selected time.

Described in detail above is a capability for detecting hardware service actions. The detection of specific state transitions provides an indication that a hardware component has been serviced. Advantageously, this capability enables a hardware component to be brought back into operation without delay, and does not require any additional notifications from the operator. Further, this capability enables a distinction to be made between operator repaired links and intermittently available links in, for instance, a multi-stage, packet switch network, as well as in other environments.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 6:
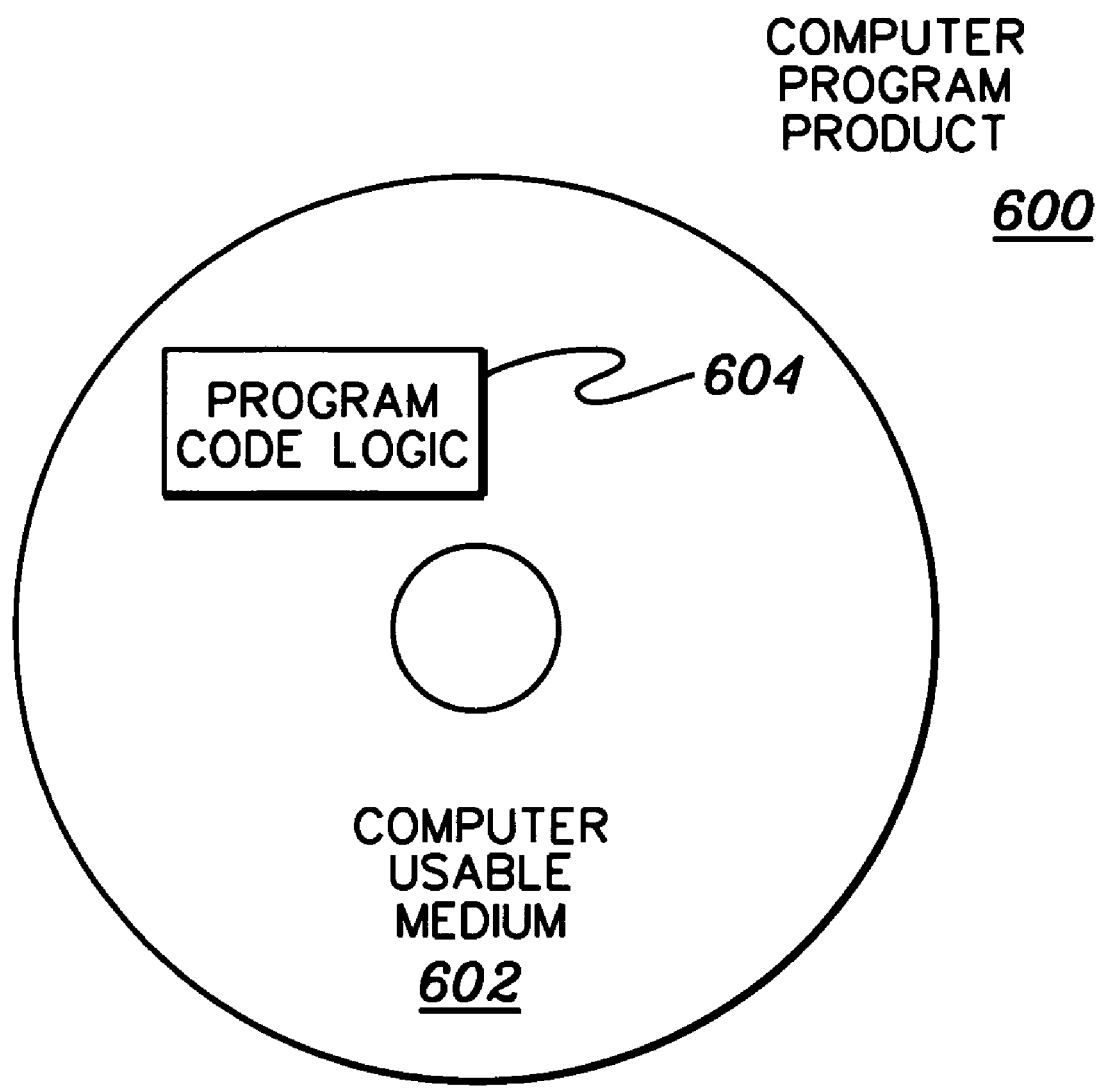
FIG. 6 depicts one embodiment of a computer program product embodying one or more aspects of the present invention.

One example of an article of manufacture or computer program product incorporating one or more aspects of the present invention is described with reference to FIG. 6. A computer program product 600 includes, for instance, one or more computer usable media 602, such as, a floppy disk, a high-capacity read-only memory in the form of an optically read compact disk or CD-Rom, a tape, or other recording media. Recording medium 602 stores computer readable program code means or logic 604 thereon to provide and facilitate one or more aspects of the present invention.

A sequence of program instructions or a logical assembly of one or more interrelated modules defined by one or more computer readable program code means or logic direct components of the service network and/or switch network to perform one or more aspects of the present invention.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

Although examples are described herein, many variations to these examples may be provided without departing from the spirit of the present invention. For instance, switch networks, other than the high performance switch network offered by International Business Machines Corporation, may benefit from one or more aspects of the present invention. Similarly, other types of networks may also use one or more aspects of the present invention. Further, the switch network described herein may include more, less or different devices than described herein. For instance, it may include less, more or different nodes than described herein, as well as less, more or different switch frames than that described herein. Additionally, the links, adapters, switches and/or other devices or components described herein may be different than that described and there may be more or less of them.

Further, the service network may include less, additional or different components than that described herein.

In yet other embodiments, components other than network managers may perform one or more aspects of the present invention. Further, the network manager may be a part of the communications environment, separate therefrom or a combination thereof.

Moreover, tasks in addition to and/or other than those described above with reference to the service action may be performed. Also, many hardware components, other than links or other types of connections, may benefit from one or more aspects of the present invention.

Additionally, the network can be in a different environment than that described herein. Further, one or more aspects of the present invention can be incorporated and used in other types of communications environments, including computing environments or other types of systems. Many other variations are considered to be included within the scope of the claimed invention.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating detection of hardware service actions, said method comprising:

automatically distinguishing, by a hardware management console, between intermittent availability of a hardware component of a communications environment indicative of an error state of the hardware component and performance of a service action to physically service the hardware component, the automatically distinguishing comprising automatically detecting, by the hardware management console and without user intervention, that a state associated with the hardware component has transitioned from connected state, to disconnected state and back to connected state, the detection of the transition from the disconnected state back to the connected state indicating performance of a service action to physically service the hardware component by an operator and indicating, restoration of constant availability of the hardware component;

responsive to the automatically detecting indicating that the hardware component has been physically serviced by the operator, automatically determining by the hardware management console absent user intervention operational viability of the hardware component, the automatically determining comprising referencing information of one or more hardware registers associated with the hardware component related to operational viability thereof;

responsive to automatically determining that the hardware component is operationally viable, using the hardware component operational; and wherein the transition from the disconnected state to the connected state comprises a transition from a disconnected state of a physical layer of the hardware component to a connected state of the physical layer of the hardware component, and wherein the detection of the transition from the disconnected state to the connected state indicates performance of a service action for the hardware component to correct for an error in the physical layer of the hardware component, the service action to correct for the error in the physical layer of the hardware component comprising removing a cable associated with the link, at least one of repairing a component of the link and replacing a component of the link, and re-installing the cable.

2. The method of claim 1, wherein the automatically detecting comprises querying one or more states of the hardware component to detect the transition.

3. The method of claim 1, wherein the determining comprises checking information of one or more registers associated with the hardware component to determine whether the connected hardware component is operational.

4. The method of claim 1, wherein the hardware component comprises a self-timing link.

5. A communications system for facilitating detection of hardware service actions, the communications system comprising:
   a hardware management console capable of performing a method, said method comprising:
      automatically distinguishing between intermittent availability of a hardware component of a communications environment indicative of an error state of the hardware component and performance of a service action to physically service the hardware component, the automatically distinguishing comprising automatically detecting, by! the hardware management console and without user intervention, that a state associated with the hardware component has transitioned from connected state, to disconnected state and back to connected state, the detection of the transition from the disconnected state back to the connected state indicating performance of a service action to physically service the hardware component by an operator and indicating restoration of constant availability of the hardware component;
      responsive to the automatically detecting indicating that the hardware component has been physically serviced by the operator, automatically determining by the hardware management console absent user intervention whether operational viability of the hardware component, the automatically determining comprising referencing information of one or more hardware registers associated with the hardware component related to operational viability thereof; and
      wherein the transition from the disconnected state to the connected state comprises a transition from a disconnected state of a physical layer of the hardware component to a connected state of the physical layer of the hardware component, and wherein the detection of the transition from the disconnected state to the connected state indicates performance of a service action for the hardware component to correct for an error in the physical layer of the hardware component, the service action to correct for the error in the physical layer of the hardware component comprising removing a cable associated with the link, at least one of repairing a component of the link and replacing a component of the link, and re-installing the cable.

6. The communications system of claim 5, wherein the automatically detecting comprises querying one or more states of the hardware component to detect the transition.

7. The communications system of claim 5, wherein the determining comprises checking information of one or more registers associated with the hardware component to determine whether the connected hardware component is operational.

8. The communications system of claim 5, wherein the hardware component comprises a self-timing link.

9. A computer program product for facilitating detection of hardware service actions, the computer program product comprising:
   a storage medium readable by a processor and storing instructions for execution by the processor for performing a method comprising:
      automatically distinguishing between intermittent availability of a hardware component of a communications environment indicative of an error state of the hardware component and performance of a service action to physically service the hardware component, the automatically distinguishing comprising automatically detecting, by the hardware management console and without user intervention, that a state associated with the hardware component has transitioned from connected state, to disconnected state and back to connected state, the detection of the transition from the disconnected state back to the connected state indicating performance of a service action to physically service the hardware component by an operator and indicating restoration of constant availability of the hardware component;
      responsive to the automatically detecting indicating that the hardware component has been physically serviced by the operator, automatically determining by the hardware management console absent user intervention operational viability of the hardware component, the automatically determining comprising referencing information of one or more hardware registers associated with the hardware component related to operational viability thereof; and
      wherein the transition from the disconnected state to the connected state comprises a transition from a disconnected state of a physical layer of the hardware component to a connected state of the physical layer of the hardware component, and wherein the detection of the transition from the disconnected state to the connected state indicates performance of a service action for the hardware component to correct for an error in the physical layer of the hardware component, the service action to correct for the error in the physical layer of the hardware component comprising removing a cable associated with the link, at least one of repairing a component of the link and replacing a component of the link, and re-installing the cable.

10. The computer program product of claim 9, wherein the automatically detecting comprises querying one or more states of the hardware component to detect the transition.

11. The computer program product of claim 9, wherein the determining comprises checking information of one or more registers associated with the hardware component to determine whether the connected hardware component is operational.

12. The computer program product of claim 9, wherein the hardware component comprises a self-timing link.

* * * * *